United States Patent [19]

Machii et al.

[11] Patent Number: 4,692,810
[45] Date of Patent: Sep. 8, 1987

[54] PROCESS FOR PRINTED DRAW-FORMED BODY, AND CONTAINER FORMED BY THIS PROCESS

[75] Inventors: Akihiko Machii; Hiroo Ikegami, both of Yokohama; Masao Ishinabe, Atsugi; Katsuhiro Imazu, Yokohama; Hiroshi Ueno, Yokosuka, all of Japan

[73] Assignee: Toyo Seikan Kaisha, Ltd., Tokyo, Japan

[21] Appl. No.: 865,465

[22] Filed: May 21, 1986

[30] Foreign Application Priority Data

May 22, 1985 [JP] Japan ................. 60-108377
May 22, 1985 [JP] Japan ................. 60-108378
Oct. 17, 1985 [JP] Japan ................. 60-229828

[51] Int. Cl.$^4$ ............................................. H04H 1/00
[52] U.S. Cl. ..................................... 358/256; 358/140; 358/280
[58] Field of Search .................. 358/256, 280, 140

[56] References Cited

U.S. PATENT DOCUMENTS

| | | | |
|---|---|---|---|
| 4,415,928 | 11/1983 | Strolle et al. | 358/140 |
| 4,471,449 | 9/1984 | Leavitt et al. | 358/140 |
| 4,484,188 | 11/1984 | Ott | 358/140 |
| 4,528,693 | 7/1985 | Pearson | 358/140 |

Primary Examiner—Edward L. Coles, Sr.
Attorney, Agent, or Firm—Sherman and Shalloway

[57] ABSTRACT

A process for the preparation of a printed draw-formed body having a printed image on the side wall thereof by subjecting a prior-printed blank to draw-forming, which comprises converting an image of an original to be printed to a digital image element signal on a rectangular coordinate, converting the image element signal on the rectangular coordinate to an image signal or image signals on a corresponding conversion coordinate formed by developing the rectangular coordinate to an annular plane having an area substantially equal to the area of said rectangle, reading image element signals on the conversion coordinate in order of the coordinate, photo-electrically converting the read image element signals to a printing plate for the blank and printing the blank by using the formed printing plate. According to this process, since digital coordinate conversion is performed while compensating anisotropy of the elongation of the metal blank, an improved printing precision can be obtained in a draw-formed body.

8 Claims, 20 Drawing Figures

Fig. 3-A
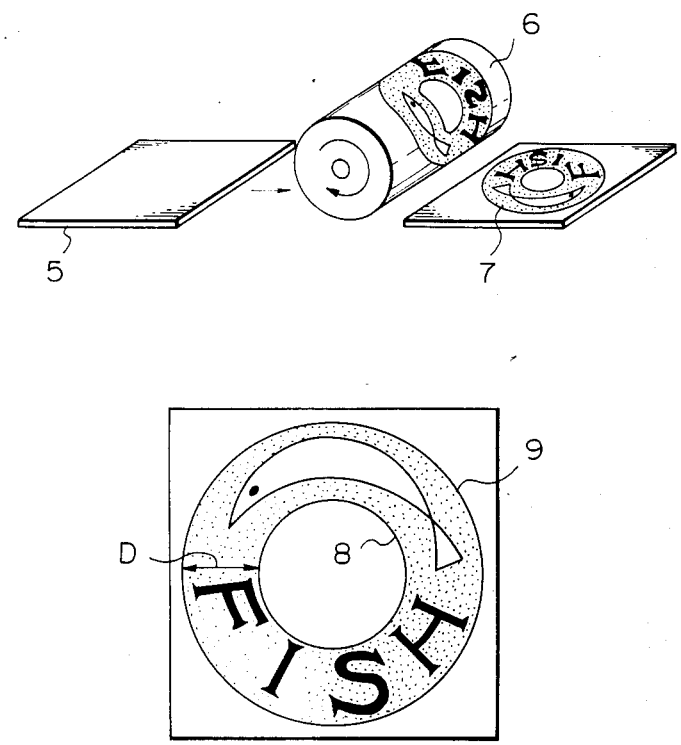

Fig. 3-B
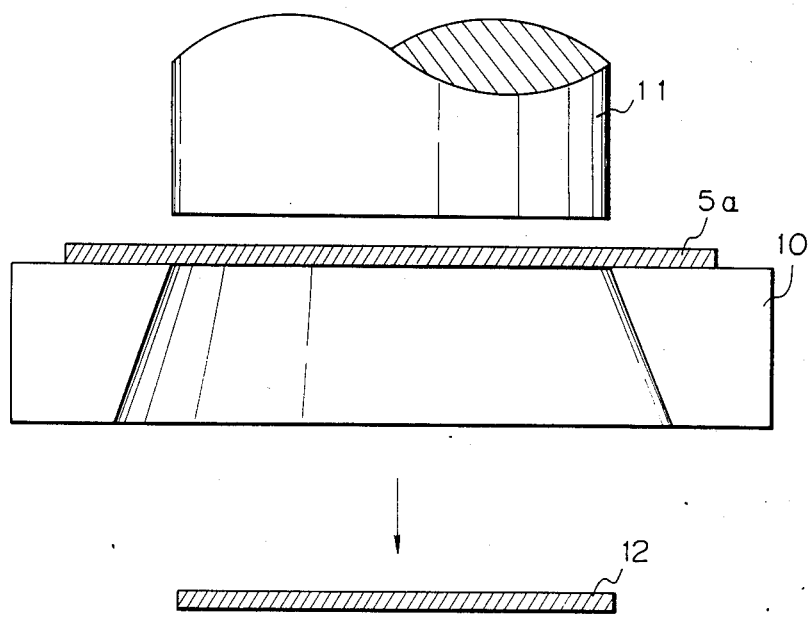

Fig. 3-C
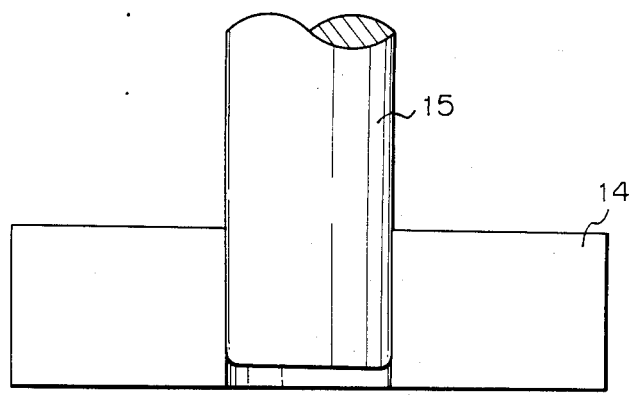
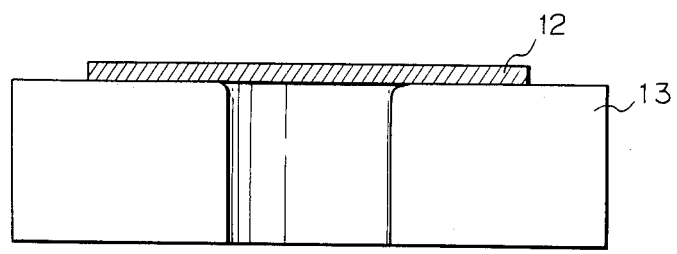

Fig. 6-A
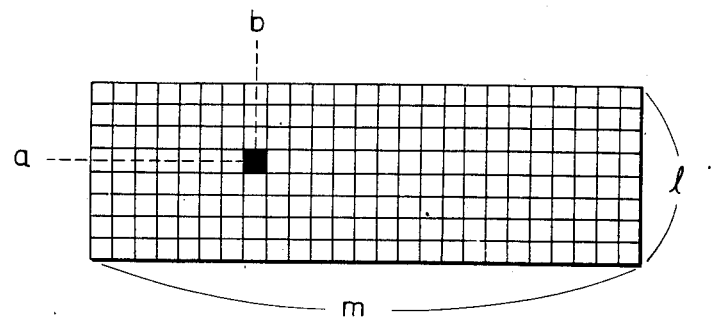
Fig. 6-B
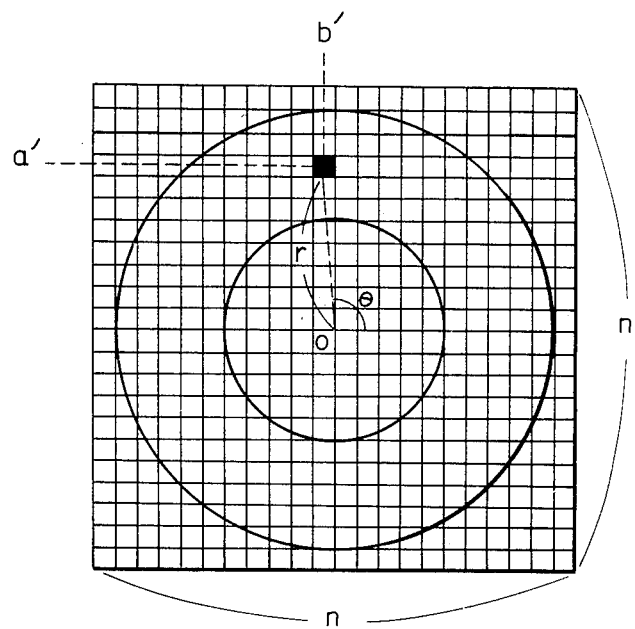

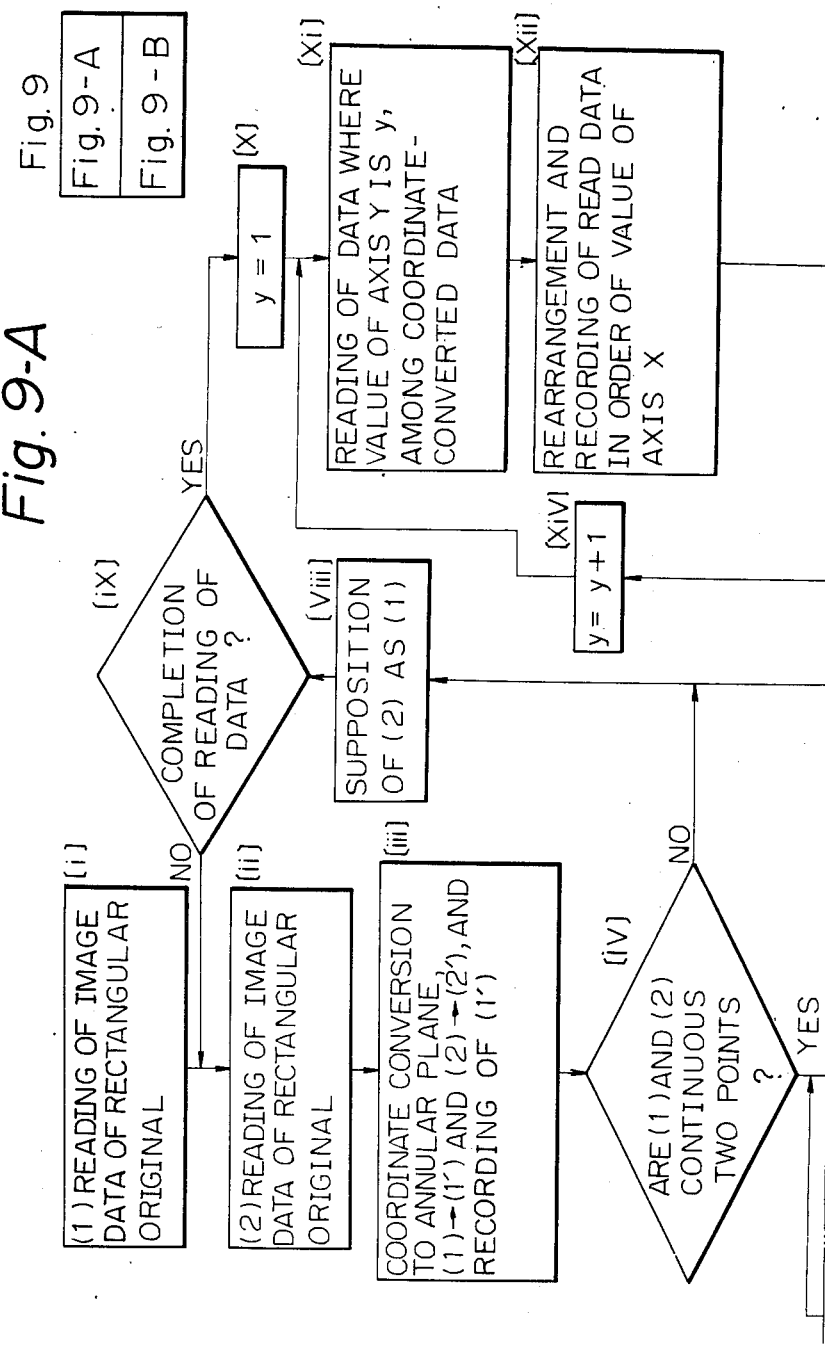

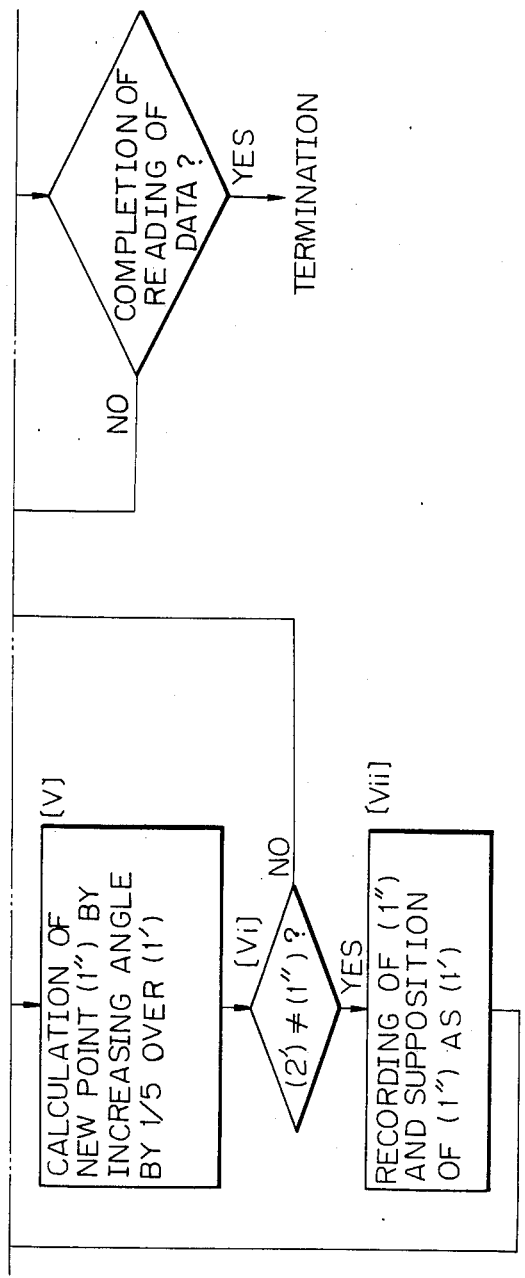
Fig. 9-B

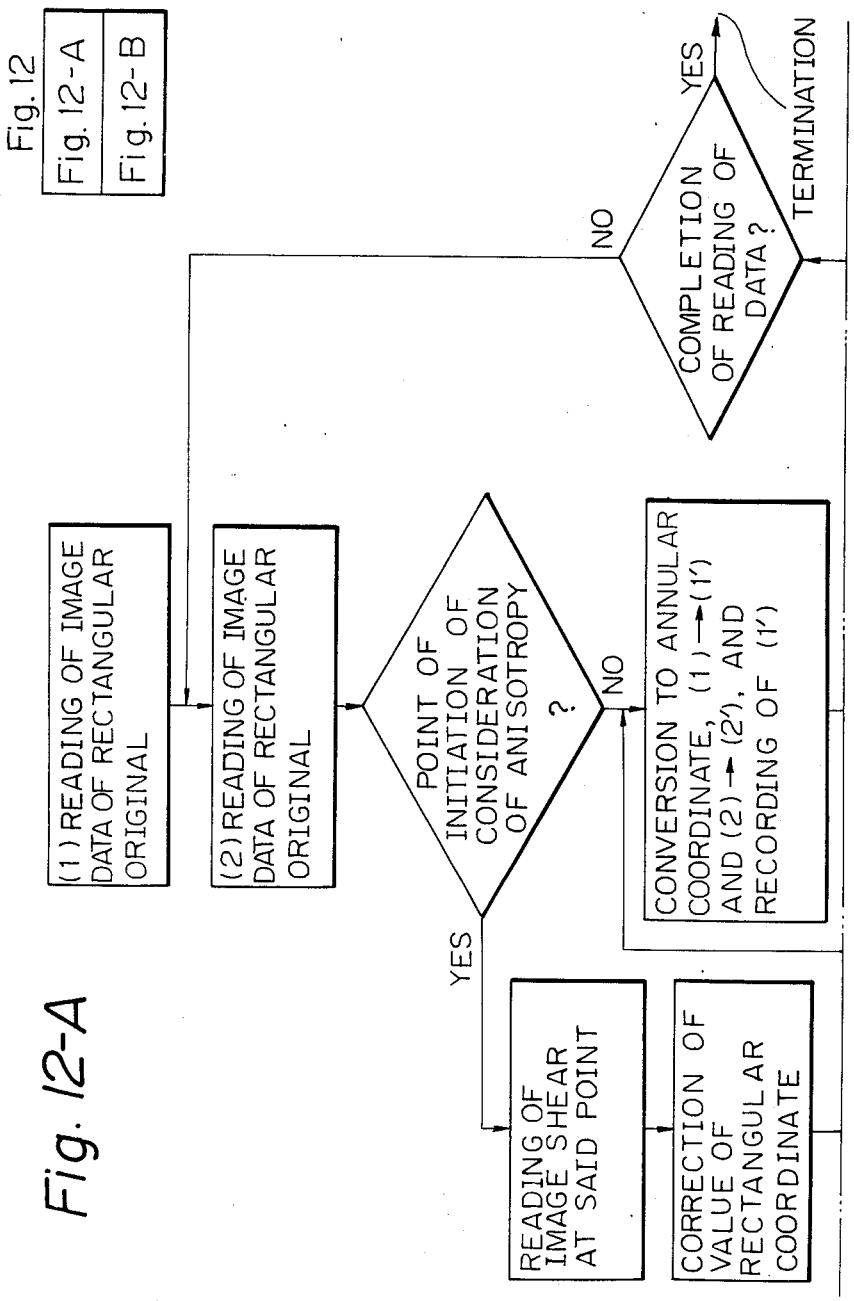

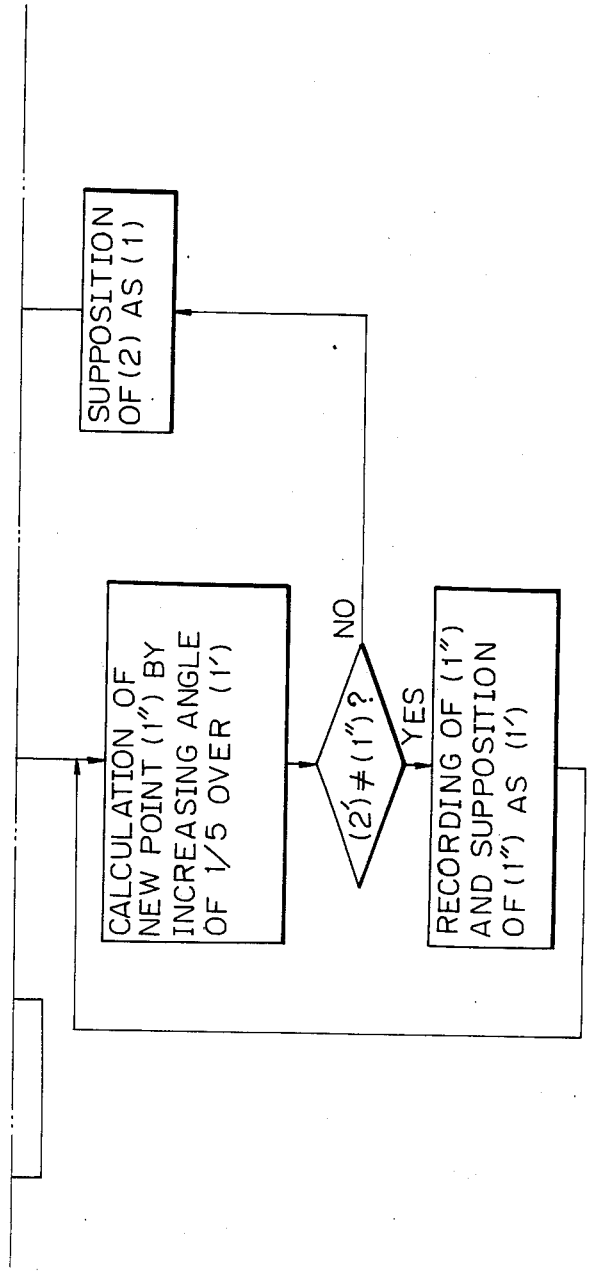
Fig. 12-B

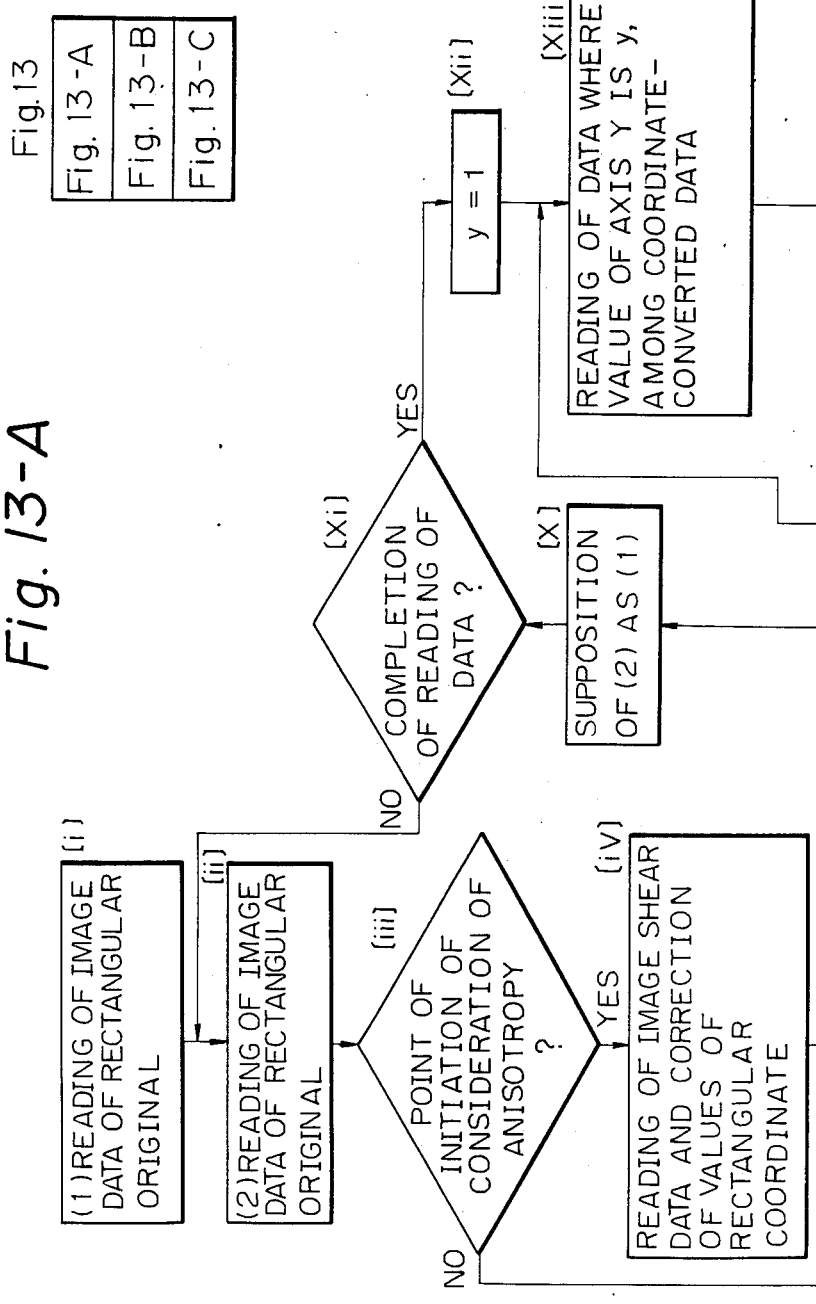

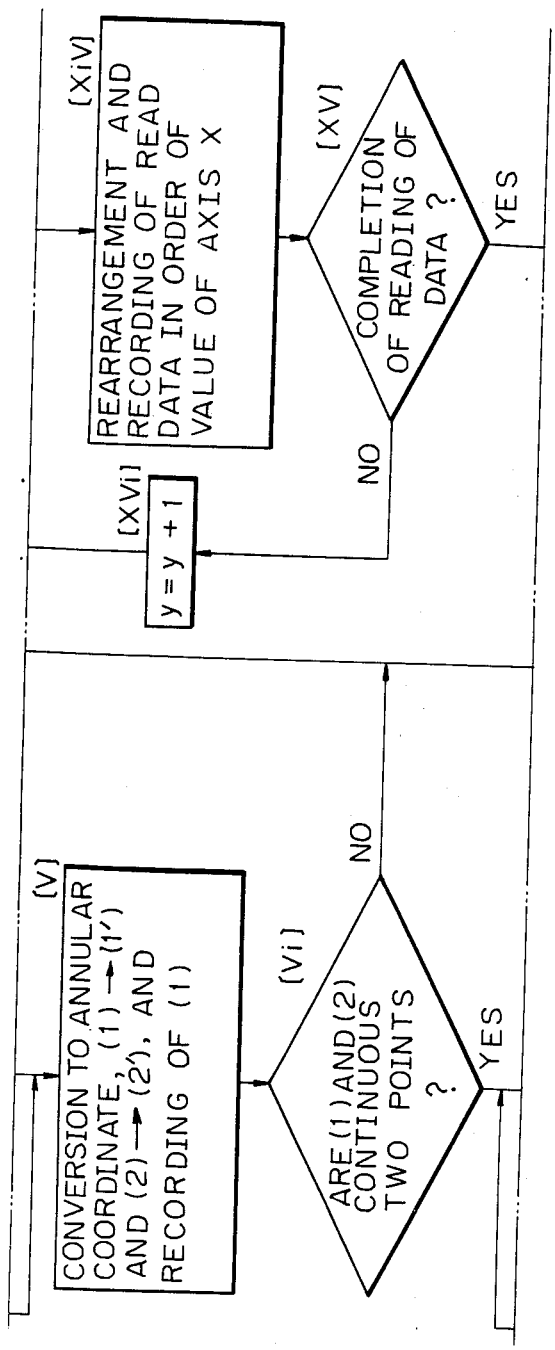
Fig. 13-B

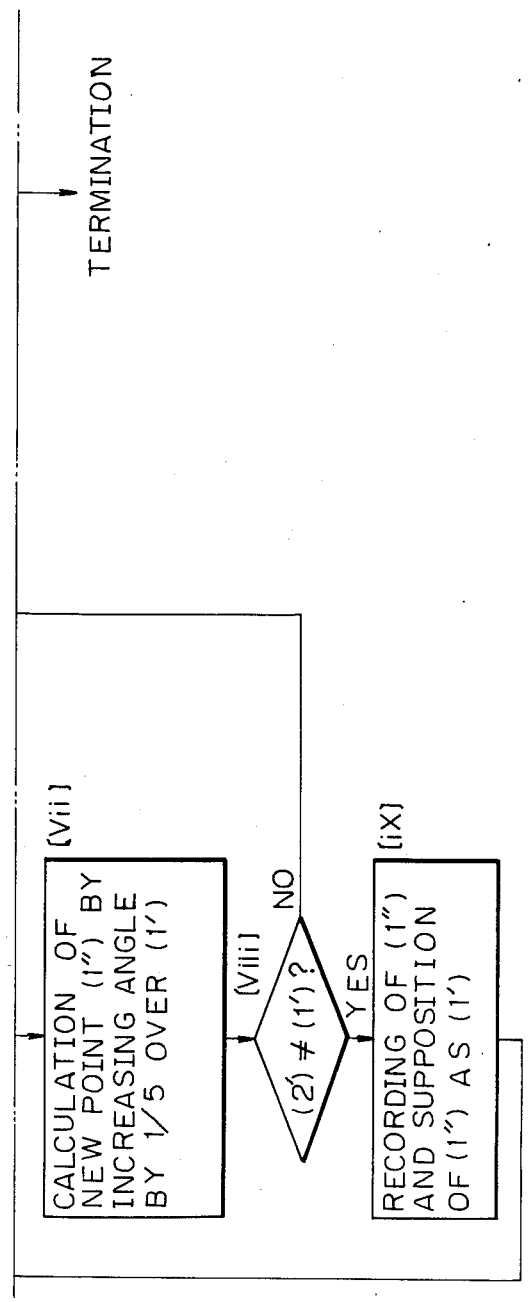
Fig. 13-C

PROCESS FOR PRINTED DRAW-FORMED BODY, AND CONTAINER FORMED BY THIS PROCESS

BACKGROUND OF THE INVENTION (1) Field of the Invention

The present invention relates to a process for the preparation of a printed draw-formed body. More particularly, the present invention relates to an improvement in the process for preparing a cup-shaped container or a cup from a sheet-like blank such as a metal sheet by draw-forming, wherein the portion of the sheet-like blank, which corresponds to the side face of a final draw-formed body, is printed in advance to form a printed image having no error in the state of the draw-formed body. More particularly, the present invention relates to a process for the preparation of a printed draw-formed body in which formation of a printing plate from a printing original is performed by a computer image processing. Moreover, the present invention relates to a printed draw-formed can on which a printed image excellent in the linearity, which has no error, is formed while taking anisotropy of the plastic flow of a metal blank into consideration, and a process for the preparation of this can.

(2) Description of the Prior Art

Draw-forming of a surface-treated steel sheet such as tinplate or tin-free steel sheet or a metal sheet such as an aluminum sheet has been broadly utilized for the production of a so-called seamless can (two-piece can) or a metal cup. Coating or printing of respective draw-formed bodies after the draw-forming operation is troublesome and requires complicated operations. Accordingly, it is preferred that a sheet-like blank be coated or printed before draw-forming.

In draw-forming, the plastic flow is caused in a sheet-like blank to be formed into a cup-shaped body. In the portion of the sheet-like blank, which is to be formed into a peripheral side wall of the final draw-formed body, the plastic flow comprises not only elongation in the direction of the height of the formed body but also contraction in the radial direction.

In the prior printing of a sheet-like blank for draw-forming, in view of the above-mentioned plastic flow of the blank, it is necessary that an original which is rectangular in the developed state should be converted to an annular printing plate, and a handwriting method or optical conversion method has been heretofore adopted for this conversion.

According to the handwriting method, a rectangular transparent original having ruled squares is wound around the peripheral side of a draw-formed body, and an annular developed plane having squares corresponding to the ruled squares of the original is painted by handwriting in the area corresponding to the image area of the original to form a printing plate for a sheet-like blank. According to this method, a high skill is necessary for the preparation of the printing plate, and furthermore, great costs and long time are required. Moreover, the printed image actually reproduced on the peripheral side wall of the draw-formed body is still insufficient in the precision and the like.

A technique of preparing a printing plate by optically developing a rectangular original annularly has already been proposed. For example, Japanese Patent Publication No. 11388/70 discloses a process in which a rectangular image is photographed in such a manner that the size is shortened in the direction of the height, the shortened photo is wound around a mandle and the photo is photographed again through a frustoconical mirror arranged around the mandrel to form a printing plate having an annularly developed image. Moreover, Japanese Patent Publication No. 23455/73 discloses a process in which a frustoconical prism having a hole having an inner diameter which is substantially equal to the outer diameter of a can is arranged at the center, a rectangular original is located in the inner surface of the hole, and the original image is photographed by a camera through the above-mentioned prism and a compensating lens to form a printing plate having an annular plane.

However, these methods are defective in that troublesome operations and particular optical devices are necessary, it is difficult to reproduce a fine dot pattern at a high precision because of aberration of the optical system, and every time when the original of the draw-formed body is changed, the troublesome conversion operation has to be carried out to form a new printing plate.

In each of metal blanks for cans, the thickness is reduced by a high-degree rolling operation, and because of the influence of this rolling, anisotropy is caused in the plastic flow of the blank at the draw-forming step. Accordingly, the printed image is readily disturbed in the side wall of the obtained draw-formed can, especially the upper portion of the side wall, and the precision or linearity of the image is often degraded.

SUMMARY OF THE INVENTION

It is therefore a primary object of the present invention to provide a process for the preparation of a draw-formed body, in which an image of a rectangular original can be reproduced finely and precisely in units of dots or image elements on a printing plate having an annularly developed plane and hence, a printed image which corresponds precisely to the image of the original can be formed on the peripheral side wall of a draw-formed body.

Another object of the present invention is to provide a process for the prior printing of a blank for draw-forming, in which the formation of an annularly developed flat printing plate from a rectangular printing original is carried out by a digital computer image treatment.

Still another object of the present invention is to provide a process for the prior printing of a blank for draw-forming, in which in case of draw-formed vessels or cups having the same size, even if the design of the original is changed, the digital image treatment can be carried out very simply at a high speed by using a certain memory.

Still another object of the present invention is to provide a process for the preparation of a prior printing plate for draw-forming, in which the above-mentioned conversion treatment can be performed promptly by a computer having a relatively small capacitance.

A further object of the present invention is to provide a draw-formed printed can, in which a printed image having good precision and linearity is formed on the outer surface of the side wall of the can by the prior printing irrespectively of anisotropy of the plastic flow generated by rolling of the metal blank.

In accordance with one fundamental aspect of the present invention, there is provided a process for the preparation of a printed draw-formed body having a printed image on the side wall thereof by subjecting a prior-printed blank to draw-forming, which comprises converting an image of an original to be printed to a digital image element signal on a rectangular coordinate, converting the image element signal on the rectangular coordinate to an image signal of image signals on a corresponding conversion coordinate formed by developing the rectangular coordinate to an annular plane having an area substantially equal to the area of said rectangle, reading image element signals on the conversion coordinate in order of the coordinate, photo-electrically converting the read image element signals to a printing plate for the blank and printing the blank by using the formed printing plate.

In accordance with another aspect of the present invention, there is provided a process for the preparation of a draw-formed body having a printed image on the side wall by subjecting a prior-printed blank to draw-forming, which comprises photoelectrically converting an image of an original to be printed to an image element signal on a corresponding digital rectangular coordinate, subjecting the rectangular coordinate to digital coordinate conversion to an annular plane having an area substantially equal to the area of said rectangle, calculating a new coordinate of the image element signal present in a space between the conversion coordinates corresponding to adjacent image elements of the rectangular coordinate, substituting the image element signal on the digital rectangular coordinate into the corresponding conversion coordinate and new coordinate, reading the image element signals on the conversion coordinate in order of the ordinate, photo-electrically converting the read signals to a printing plate and printing the blank by using the formed printing plate.

In accordance with one preferred embodiment of the present invention, there is provided a process for the preparation of a draw-formed printed can, which comprises converting an image of an original to be printed to a digital image element signal on a rectangular coordinate, converting the image element signal on the rectangular coordinate to an image element signal or image element signals on a corresponding conversion coordinate formed by developing the rectangular coordinate to an annular plane having an area substantially equal to the area of said rectangle and making correction according to anisotropy of the elongation of a metal blank, reading image element signals on the conversion coordinate in order of the coordinate to form a printing plate for the blank and printing the blank by using the formed printing plate.

Furthermore, in accordance with the present invention, there is provided a process for the preparation of a draw-formed printing can having a printed image on the side wall by subjecting a prior-printed metal blank to draw-forming, which comprises converting an image of an original to be printed to an image element signal on a corresponding digital rectangular coordinate, subjecting the rectangular coordinate to digital coordinate conversion to an annular plane having an area substantially equal to the area of said rectangle and corrected according to anisotropy of the elongation of the metal blank, calculating a new coordinate of the image element signal present in a space between the conversion coordinates corresponding to adjacent image elements of the rectangular coordinate, substituting the image element signal on the digital rectangular coordinate into the corresponding conversion coordinate and new coordinate, reading the image element signals on the conversion coordinate in order of the coordinate, photoelectrically converting the read signals to a printing plate and printing the blank by using the formed printing plate.

Still further, in accordance with the present invention, there is provided a draw-formed printed can having a printed image formed at least on the outer surface of the side wall, which is prepared by subjecting a prior-printed metal blank to draw-forming, wherein the linearity in the circumferential direction of the printed image in the upper portion of the side wall is maintained at such a level that the shear in the rolling direction is within 1% of the height of the side wall and the linearity in the axial direction of the printed image is maintained at such a level that the shear at the position spaced by about 22° from the rolling direction is within 1% of the length of the circumference of the side wall.

BRIEF DESCRIPTION OF THE DRAWINGS

FIGS. 3-A through 3-C are diagrams illustrating the steps of the process for preparing the printed draw-formed body shown in FIG. 1.

FIGS. 6-A and 6-B are diagrams illustrating the coordinate conversion to an annular plane from the rectangular coordinate.

FIGS. 9A-B are flow charts illustrating the coordinate conversion operation and the operation of rewriting to the conversion coordinate from the rectangular coordinate according to another embodiment of the present invention.

FIGS. 12A-B are flow charts illustrating the coordinate conversion operation performed while taking anisotropy of the plastic flow into consideration.

FIGS. 13A-C are flow charts illustrating the coordinate conversion operation and the operation of reading image element signals from the conversion coordinate, which are performed while taking anisotropy of the plastic flow into consideration.

DETAILED DESCRIPTION OF THE PREFERRED EMBODIMENTS

The present invention will now be described in detail with reference to embodiments illustrated in the accompanying drawings.

Figure 1:
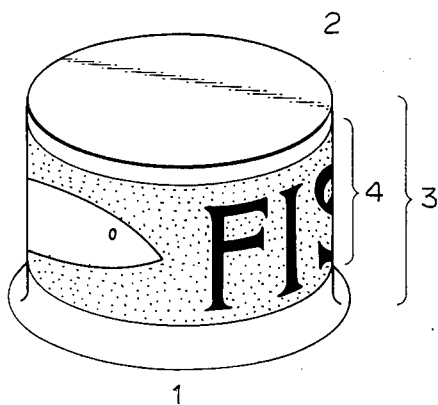
FIG. 1 is a perspective view illustrating a printed draw-forming body.
Figure 2:
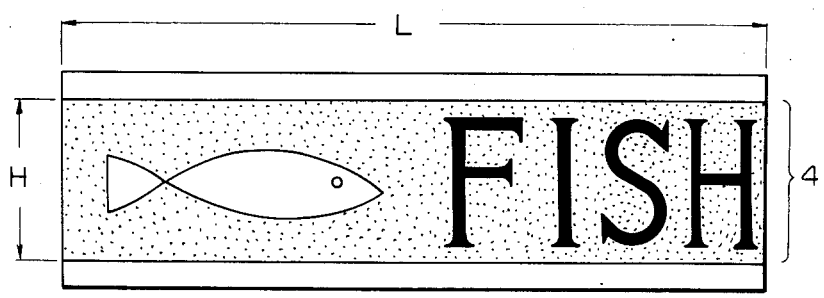
FIG. 2 is a view showing the circumferential side wall of the printed draw-formed body of FIG. 1 in the exploded state.

Referring to FIG. 1 illustrating a printed draw-formed body, this printed draw-formed body 1 comprises a bottom 2 and a circumferential side wall 3 formed integrally with the bottom 2 without a seam. A printing layer 4 is formed on the side wall 3. Referring to FIG. 2 illustrating the circumferential side wall 3 in a developed state, the printing layer 4 has a rectangular shape having a length L and a height H.

Referring to FIGS. 3-A through 3-C illustrating the steps of the process for preparing this printed draw-formed body 1, at first, an annularly developed printing layer 7 is formed on a sheet-shaped metal blank 5 by using a printing plate 6 (see FIG. 3-A). This annular printing layer 7 has an inner circumference 8 substantially equal to the length L of the rectangular printing layer 4 and an outer circumference 9 larger than the length L, and the difference D between the radius of the outer circumference and the radius of the inner circumference is smaller than the height H of the rectangular printing layer 4 and the rectangular printing layer 4 has an area substantially equal to the area of the annular printing layer 7. The printed metal blank 5a is cut into a circular blank 12 by using a shearing die 10 and a shearing punch 11 in combination at the shearing step shown in FIG. 3-B. Then, at the draw-forming step shown in FIG. 3-C, the circular blank 12 is gripped between a drawing die 13 having a caliber corresponding to the outer diameter of the formed body and a blank holder 14, and a drawing punch 15 having an outer diameter corresponding to the inner diameter of the formed body is pushed to obtain a draw-formed body 1 shown in FIG. 1.

According to the present invention, a printing plate having an annularly developed printed image is prepared from a rectangular printing original as shown in FIG. 2 by the digital image processing described in detail hereinafter.

Figure 4:
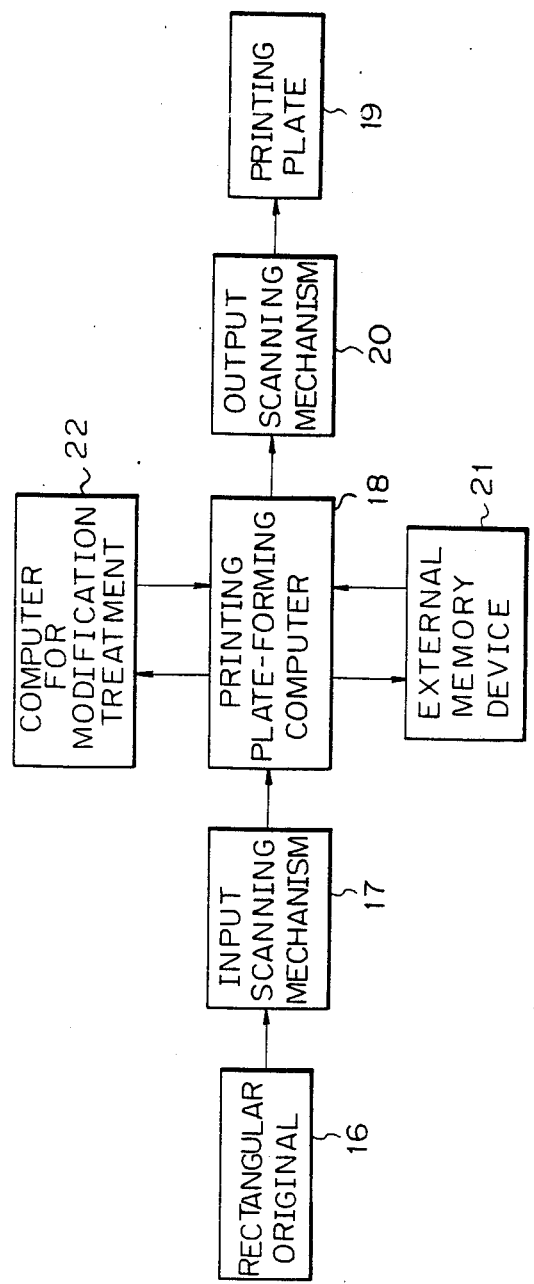
FIG. 4 is a block diagram illustrating the step of the image treatment.

Referring to a block diagram of FIG. 4 illustrating the steps of this image processing, the apparatus used for this processing comprises, in general, an input scanning mechanism 17 for converting an image of a rectangular original 16 to an electric signal, a known printing plate-forming computer 18 for receiving the image element signal from the input scanning mechanism 17 as a digital image element signal after analog/digital conversion, performing editing operations such as correction, cutting, positioning, trimming and composing based on this digital element signal according to need and putting out the digital image signal after digital/analog conversion, an output scanning mechanism 20 for preparing a printing plate or block copy 19 from electric signals from the computer 18, a memory device 21 for storing data of the plate-forming computer 18, and a modification treatment computer 22 for subjecting the digital image signal emitted from the printing plate-forming computer 18 to coordinate conversion from a rectangular coordinate to an annular coordinate having the same area as that of the rectangular coordinate and putting an image signal on the conversion coordinate into the printing plate-forming computer 18.

(First Embodiment)

According to the present invention, the digital image element signal on the rectangular coordinate, put into the printing plate-forming computer 18, is recorded as an image element signal or image element signals on a conversion coordinate formed by developing the rectangular coordinate on an annular plane having an area substantially equal to the area of said rectangle, and the image element signals on the conversion coordinate in order of the coordinate.

Generally speaking, this processing is accomplished through (i) the preparation of a correspondence table of the rectangular coordinate and the annular conversion coordinate and (ii) the rewriting operation from the rectangular coordinate to the conversion coordinate based on the correspondence table.

Figure 5:
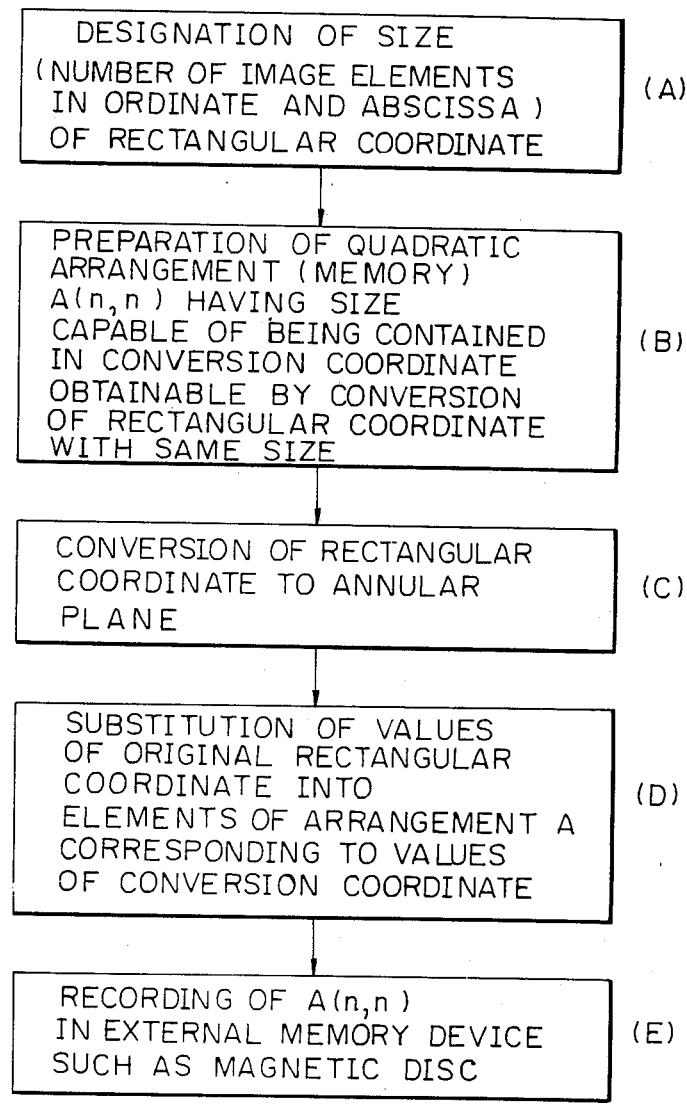
FIG. 5 is a diagram illustrating the step of forming a correspondence table of the rectangular coordinate and annular conversion coordinate.

Referring to FIG. 5 illustrating the operation (i) of preparing the correspondence table, at step (A), the size of the rectangular coordinate, that is, the number of image elements in the axes of ordinate and abscissa, is designated. Then, at step (B), a guadratic arrangement (memory) A (n,n) having a size capable of being contained in a conversion coordinate obtainable by conversion of the rectangular coordinate with the same area. At step (C), the coordinate conversion of the rectangular coordinate to an annular plane is performed. Referring to FIGS. 6-A and 6-B illustrating this coordinate conversion, the rectangular coordinate a,b (FIG. 6-A) and the corresponding conversion coordinate a', b' (FIG. 6-B) are set so that the following relations are established:

$$a' = \gamma \sin\theta + 0 \quad (1)$$

$$b' = \gamma \cos\theta + 0 \quad (2)$$

wherein a' and b' are integers obtained by rounding, and the radius $\gamma$, angle $\theta$ and center O in FIG. 6-B are expressed by the following formulae:

$$r = \sqrt{\frac{m}{\pi}\left(a + \frac{m}{4\pi}\right)} \quad (3)$$

$$\theta = \frac{2\pi b}{m} \quad (4)$$

$$O = \sqrt{\frac{m}{\pi}\left(l + \frac{m}{4\pi}\right)} \quad (5)$$

At this coordinate conversion, the influence of the plastic flow at the step of draw-forming the sheet-shaped blank should be taken into consideration. In the annular plane shown in FIG. 6-B, at the draw-forming step, the contraction flow is caused in the circumferential direction and the elongation flow is caused in the radial direction. Accordingly, at the coordinate conversion, the number of image elements in the circumferential direction should be increased in advance while the number of image elements in the radial direction should be described.

Figure 7:
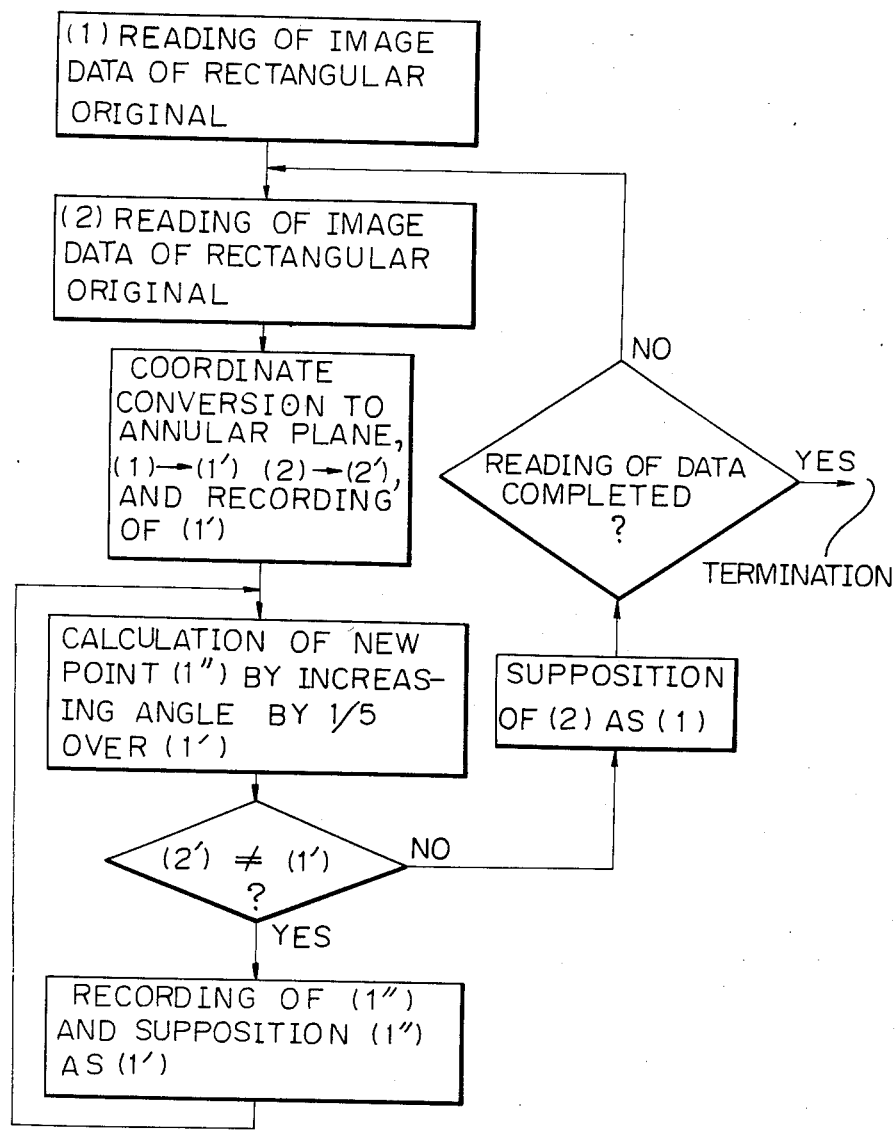
FIG. 7 is a flow chart illustrating the coordinate conversion operation.

This operation is carried out according to the flow chart shown in FIG. 7. More specifically, ordinate values (1) and (2) adjacent to each other in the direction of the axis X of the rectangular coordinate are read, and the coordinate conversion of (1)→(1') and (2)→(2') is carried out by the above operation. Between (1') and (2'), the angle is increased to some extent (for example, by 1/5), and a new ordinate value (1") including this increase of the angle is calculated. In case of (2')≠(1"), (1") is regarded as (1') and a new ordinate value corresponding to the above-mentioned increased angle is calculated. In case of (2")=1, the above operation is repeated by adopting (2) as (1). Thus, correspondency between the ordinate value of the rectangular coordinate and the ordinate values of the conversion coordinate is easily determined. Decrease of the ordinate value in the radial direction is easily effected because a plurality of ordinate values of the rectangular coordinate correspond to one ordinate value of the conversion coordinate (the data put in later is stored).

Referring to FIG. 5 again, at step (D), the original value of the rectangular coordinate is substituted into the element of arrangement A corresponding to the ordinate value obtained by the conversion. More specifically, in FIGS. 6-A and 6-B, when the conversion of a→a' and b→b' is effected, substitution of A(a', b')←a*$\epsilon$+b ($\epsilon$ is a number of $10^P$ when b is a number of p figures) is effected.

The operations of the steps (C) and (D) are carried out with respect to all the ordinate values of the rectangular coordinate.

Finally, the obtained quadratic arrangement A (n,n) is stored in an external memory device such as a magnetic disc to complete the operation of the process for preparing the correspondence table. According to the present invention, once the correspondence table is prepared, this correspondence table can be used for draw-formed bodies of the same size even if the original or design is changed.

Figure 8:
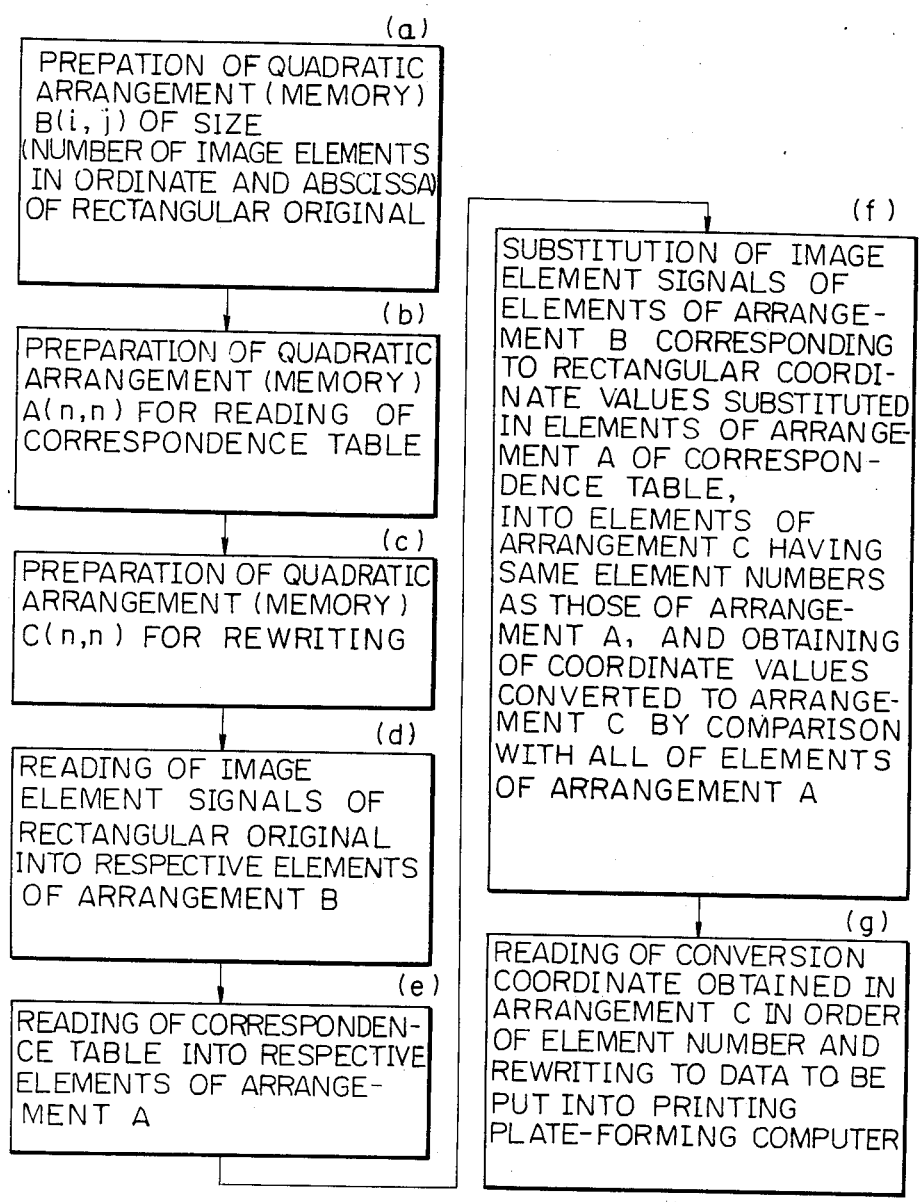
FIG. 8 is a diagram illustrating the operation or rewriting to the conversion coordinate from the rectangular coordinate.

Referring to FIG. 8 illustrating the rewriting operation (ii) from the rectangular coordinate to the conversion coordinate based on the so-prepared correspondence table, at step (A), a quadratic arrangement (memory) B (l, m) of the size (the number of image elements in the axes of the ordinate and abscissa) of the rectangular coordinate is prepared.

Then, at step (B), a quadratic arrangement (memory) A (n,n) for reading the above-mentioned correspondence table is prepared, and at step (C), a quadratic arrangement C (n,n) for rewriting is prepared.

At step (D), image element signals of the rectangular original are read in respective elements of the arrangement B from the printing plate-forming computer. At step (E), the correspondence table prepared and stored in advance is read with respect to respective elements of the arrangement A.

At step (F), with respect to each element of the arrangement A in the correspondence table, the image element signal of the element of the arrangement B corresponding to the substituted ordinate value of the rectangular coordinate is substituted in the element of the arrangement C having the same element number as that of the arrangement A. More specifically, the ordinate value of the rectangular coordinate substituted in the correspondence table A (a', b') is (a,b) as pointed out hereinbefore, but the image element signal is substituted in the form of C(a',b')←B(a,b). At step (F), the element of the arrangement B is compared with all the elements of the arrangement A to obtain an image element signal converted to the arrangement C.

Finally, at step (E), the conversion coordinate values obtained in the arrangement C are read according to the coordinate and are rewritten for putting them into the printing plate-forming computer 18.

According to the present invention, by the foregoing operations, the image element signal (B(a,b)) on the rectangular coordinate is converted to an image signal or image signals (C(a',b')) of a corresponding conversion coordinate formed by developing the rectangular coordinate to an annular plane having an area substantially equal to the area of the rectangular coordinate, and the image element signals on the conversion coordinate can be read and put out in order of the coordinate.

The image element signals on the conversion coordinate are supplied to the output scanning mechanism 20 in order of the coordinate and a printing plate or block copy is prepared.

According to the present invention, digital image element signals on the above-mentioned rectangular coordinate are subjected to coordinate conversion to image element signals of a conversion coordinate of an annular plane by means of a computer, whereby influences on images formed by photographing by a camera or development treatment, such as the fading of the image and the change of the density, can be prevented and prior printing of a blank for draw-forming can be faithfully performed with a good reproducibility. Moreover, the step number and treatment time required for the preparation of a printing plate can be greatly reduced. Furthermore, distortion of the image owing to the difference in the directions at the draw-forming step is completely compensated and the image quality can be easily improved. Still further, if the correspondence table for the coordinate conversion is prepared according to the present invention, the correspondence table can be utilized repeatedly for cans of the same size even if the design or original is changed, whereby the treatment can be promptly accomplished.

(Second Embodiment)

According to the second embodiment of the present invention, image element signals on the conversion coordinate can be directly obtained from image element signals on the rectangular coordinate without preparing the above-mentioned correspondence table.

In the second embodiment of the present invention, a rectangular coordinate is subjected to digital coordinate conversion to an annular plane having an area substantially equal to said rectangle by a modification treatment computer 22, a new coordinate of the image element signal present in a space between the conversion coordinates corresponding to adjacent image elements of the rectangular coordinate is calculated, the image element signal on the rectangular coordinate put into a printing plate-forming computer 18 is substituted into the corresponding conversion coordinate and new coordinate, and the image element signals on the conversion coordinate are read and put out in order of the ordinate.

Referring to the flow chart of FIG. 9 illustrating this operation, at step (i), data (1) is read out from digital image signal data from the printing plate forming computer 18, and at step (ii), data (2) adjacent to the data (1) in the direction of the axis X of the rectangular coordinate is read.

At step (iii), with respect to the data (1) and (2) read at steps (i) and (ii), coordinate conversion of data (1) to data (1') and data (2) to data (2') is carried out between the rectangular coordinate and the conversion coordinate formed by converting the rectangular coordinate to an annular plane having the same area as that of the rectangular coordinate, and the data (1') is recorded. This coordinate conversion at step (iii) is performed according to the procedures described hereinbefore in the first embodiment with reference to FIGS. 6-A and 6-B.

At step (iv) shown in FIG. 9, it is judged whether or not the data (1) and (2) adjacent in the direction of the axis X of the rectangular coordinate are two points of a continuous color. If the data (1) and (2) are two points of a continuous color, the angle is increased to some extent (for example, by 1/5) between (1') and (2'), and a new ordinate value (1") is calculated.

Then, at step (vi), the new coordinate value is compared with the conversion coordinate value (2'), and in case of (2')≠(1"), (1") is recorded at step (vii) and the new coordinate value (1") is substituted into (1'). At step (v), a new coordinate value corresponding to the new increase of the angle is calculated and this operation is similarly continued until (2') is equal to (1").

When (2') becomes equal to the new coordinate value (1") at step (vi), the data (2) of the rectangular coordinate is changed to (1) at step (viii), and at step (ix) it is judged whether or not reading of data of the rectangular coordinate is completed. If reading is not completed, new data (2) is read at step (ii), and the above-mentioned operation is repeated. Incidentally, if at step (iv) it is judged that the data (1) and (2) are not two points of a continuous color, reading of subsequent data is carried out while adopting (2) as (1).

According to the present embodiment of the present invention, comparison is readily accomplished between values of the rectangular coordinate and the values of the annular plane as the conversion coordinate, and calculation of a new coordinate of an image element present in a space between two conversion coordinate points obtained by this comparison can be easily accomplished, and furthermore, data can be increased in the circumferential direction in advance by substituting image element signals on the rectangular coordinate into the conversion coordinate or new coordinate. Moreover, decrease of the coordinate values in the radical direction can be easily accomplished by comparing a plurality of coordinate values of the rectangular coordinate values with one coordinate value of the conversion coordinate (the data introduced later is stored).

Referring to FIG. 9, if it is judged at step (ix) that reading of data of the rectangular coordinate is completed, at step (x) the image element coordinate value is regarded as y=1 and at step (xi) the data in which the value on the ordinate Y is y is read among data recorded after the coordinate conversion.

Then, at step (xii), the read data are re-arranged in order of the value in the ordinate X and recorded (sorting). At step (xiii), it is judged whether or not recording of the coordinate-converted data is completed. If recording is not completed, supposition of y=y+1 is made at step (xiv) and reading of data is carried out at step (xi), and the subsequent operation is continued.

Thus, the coordinate-converted data are put in the printing plate-forming computer 18 in order of recording.

As is apparent from the foregoing description, according to the second embodiment of the present invention, an image element signal on the rectangular coordinate is converted to an image element signal or image element signals on a conversion coordinate formed by developing the rectangular coordinate to an annular plane having an area substantially equal to said rectangle, and the image element signals on the conversion coordinate can be read and put out in order of the coordinate.

The image element signals on this conversion coordinate are supplied to the output scanning mechanism 20 in order of the coordinate to form a printing plate or block copy.

According to the second embodiment of the present invention, in addition to the advantages described hereinbefore with respect to the first embodiment, there can be attained an advantage in that by performing the coordinate conversion in the above-mentioned manner, a printing plate can be formed promptly by using a computer having a relatively small capacitance.

(Third Embodiment)

Figure 10:
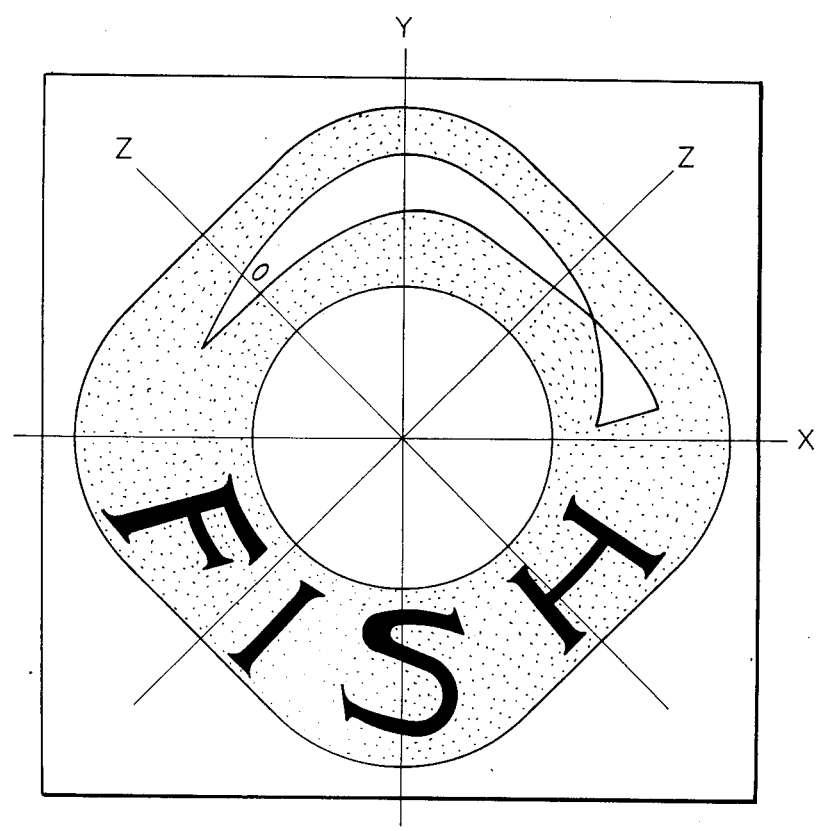
FIG. 10 is a plan view showing a printing plate having a printing image formed while taking anisotropy of the plastic flow at the draw-forming operation into consideration.

As pointed out hereinbefore, in the portion to be formed into the circumferential side wall 3 of the draw-formed can 1, the elongation flow is caused in the direction of the height of the formed body and the contraction flow is caused in the circumferential direction. These plastic flows are not uniformly caused on the entire surface of the metal blank 5 but anisotropy is observed in these plastic flows. FIG. 10 illustrates anisotropy of the flow of the metal blank 5, and it has been found that the elongation is smallest in the rolling direction X at the preparation of the metal blank 5 and in the direction Y orthogonal thereto and is largest in the direction Z forming an angle of 45° to the axes X and Y. Accordingly, if a rectangular printing layer is converted to an annular printing layer and applied to the metal blank 5, greatly elongated portions and slightly elongated portions appear alternately at intervals of 45°, and the printed image has a wavy shape and the linearity cannot be maintained in the circumferential direction. Moreover, this variance of the elongation results in the position shear of the printed image.

According to the third embodiment of the present invention, a printing plate having an annularly developed printing image, as shown in FIG. 10, can be obtained from a rectangular original as shown in FIG. 2 while taking anisotropy of the plastic flow into consideration, and this can be accomplished by the following digital image processing.

According to this embodiment of the present invention, a digital image element signal on the rectangular coordinate, which is put in the printing plate-forming computer 18, is recorded as an image element signal or image element signals on the conversion coordinate, which is formed by developing the rectangular coordinate to an annular plane having an area substantially equal to said rectangle and making correction according to anisotropy of the elongation, by the modification treatment computer, and the image element signals on the conversion coordinate are read in order of the coordinate.

In general, this treatment is performed through (1') the preparation of a correspondence table between the rectangular coordinate and the annular conversion coordinate while taking anisotropy of the plastic flow into consideration and (ii) the rewriting from the rectangular coordinate to the conversion coordinate based on the correspondence table.

Figure 11:
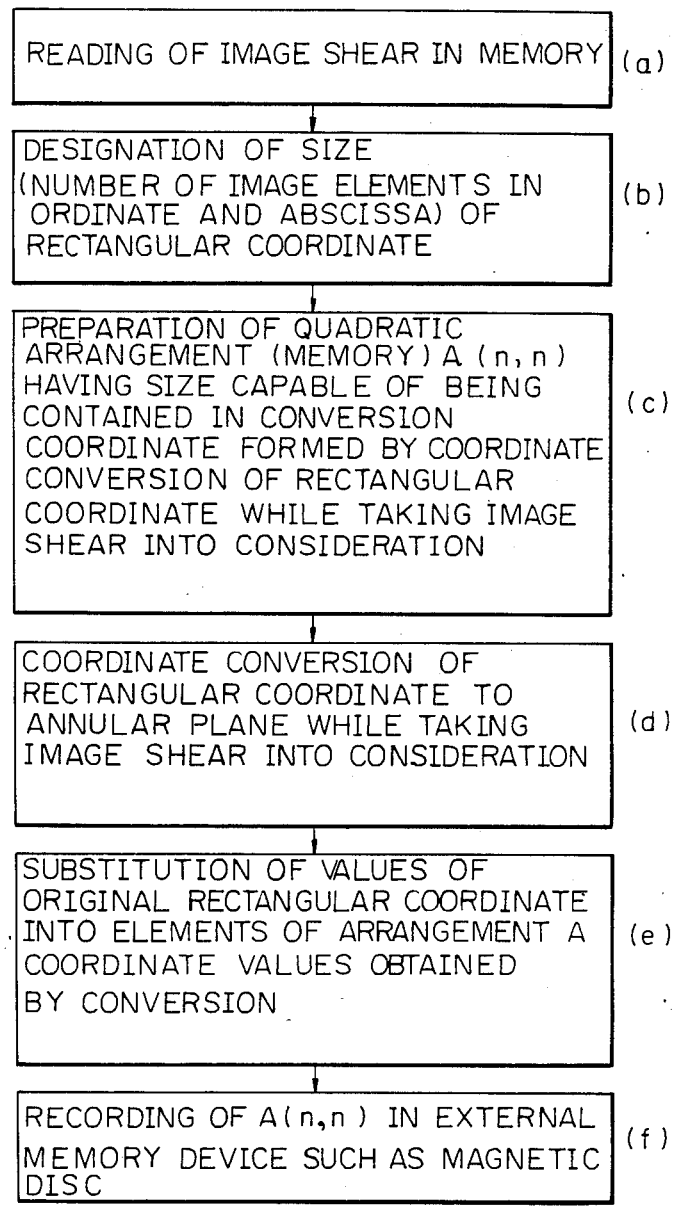
FIG. 11 is a diagram illustrating the step of forming a correspondence table of the rectangular coordinate and annular conversion coordinate.

Referring to FIG. 11 illustrating the process (1') of preparing the correspondence table, at step (a) the data of the image shear is read in a memory, and at step (b) the size of the rectangular coordinate, that is, the number of image elements in the ordinate and abscissa, is designated. At step (c), a guadratic arrangement (memory) A (n,n) having a size capable of being contained in a conversion coordinate formed by converting the rectangular coordinate while taking the image shear into consideration is prepared. At step (d) the rectangular coordinate is converted to an annular plane while taking anisotropy of the plastic flow at the draw-forming step into consideration. This conversion is carried out in the same manner as described above with respect to the first embodiment while referring to FIGS. 6-A and 6-B.

It is important that anisotropy of the plastic flow at the draw-forming step should be taken into consideration at this coordinate conversion. Namely, in the direction Z spaced by 45° from the above-mentioned rolling direction, the elongation in the axial direction (radial direction of the blank) is largest, and the elongation is smallest in the rolling direction X or the direction orthogonal thereto. Accordingly, it is necessary that the printing image to be applied to the blank should be contracted according to the increase of the length by this elongation in advance. Accordingly, data of the image shear in the height direction and circumferential direction are prepared for many typical points spaced at predetermined intervals on the rectangular coordinate, and anisotropy of the plastic flow is compensated at the coordinate conversion based on the data of the image shear.

This operation is carried out according to the flow chart of FIG. 12. Namely, the coordinate values (1) and (2) adjacent to each other in the direction of the axis X of the rectangular coordinate, and it is judged whether or not these coordinate values are present at the set position where anisotropy of the plastic flow should be taken into consideration. When the coordinate values are present at the position other than the above-mentioned set position, the coordinate conversion is carried out in the same manner as in the first embodiment.

In the case where the read coordinate values are present at the set position where anisotropy should be taken into consideration, the data of the image shear in the height direction and/or the circumferential direction at each point is read, and the values of the rectangular coordinate are corrected and the above-mentioned coordinate conversion is carried out.

By referring to FIG. 11 again, at step (e) the original values of the rectangular coordinate are substituted as the elements of the arrangement A corresponding to the values of the coordinate obtained by the conversion. Namely, when conversion of a→a' and b→b' is effected in FIGS. 6-A and 6-B, substitution of A(a', b')←a*$\epsilon$+b($\epsilon$ stands for a number of $10^p$ when b is a number of p figures) is performed.

The operations of the steps (d) and (e) are performed on all the coordinate values of the rectangular coordinate.

Finally, the obtained quadratic arrangement A (n,n) is recorded in an external memory device such as a magnetic disc to complete the preparation of the correspondence table. According to the present invention, once this correspondence table is prepared, the table can be used for draw-formed bodies having the same size even if the original or design is changed.

The operation (ii) of the rewriting from the rectangular coordinate to the conversion coordinate based on the correspondence table is carried out in the same manner as described above with respect to the first embodiment with reference to FIG. 8.

According to this embodiment of the present invention, by the above-mentioned operation, an image element signal (B(a,b)) on the rectangular coordinate is converted to an image element signal or image element signals (C(a',b')) on the conversion coordinate formed by developing the rectangular coordinate to an annular plane having an area substantially equal to said rectangle and making correction according to anisotropy of the elongation of the metal blank, and the image element signals on the conversion coordinate can be read and put out in order of the coordinate.

The image element signals on the conversion coordinate are supplied to the output scanning mechanism 20 in order of the coordinate to prepare a printing plate or block copy.

(Fourth Embodiment)

According to the fourth embodiment of the present invention, image elements on the conversion coordinate can be directly obtained from image element signals on the rectangular coordinate while compensating anisotropy of the elongation of the blank without preparing the correspondence table described hereinbefore with respect to the third embodiment.

According to the present embodiment, by the modification treatment computer 22, the rectangular coordinate is subjected to digital coordinate conversion to an annular plane having an area substantially equal to said rectangle and being corrected according to anisotropy of the elongation of the metal blank, a new coordinate of an image element present in a space between the conversion coordinates corresponding to adjacent elements of the rectangular coordinate are calculated, and the image element signals on the rectangular coordinate put in the printing plate-forming computer 18 are substituted in the corresponding conversion coordinate and new coordinate, and the image element signals on the conversion coordinate are read and put out in order of the coordinate.

Referring to the flow chart of FIG. 13 illustrating this operation, at step (i), data (1) is read from the digital image element signal data from the printing-plating computer 18, and at step (ii), the data (2) adjacent to the data (1) in the direction of the axis X of the rectangular coordinate is read.

At step (iii), it is judged whether or not the rectangular coordinate values of the data (i) and (ii) read at the steps (i) and (ii) are located at set positions where anisotropy should be taken into consideration. In the case where the rectangular coordinate values are present at such set positions, at step (iv), data of the image shear in the height direction and/or the circumferential direction at each position is read to correct the rectangular coordinate values, and the coordinate conversion is effected at step (v). If the rectangular coordinate values are located at positions other than the step positions where anisotropy should be taken into consideration, the coordinate conversion is directly carried out at step (v).

Namely, at step (v), the coordinate conversion of data (1) to (1') and data (2) to (2') is carried out between the rectangular coordinate and the conversion coordinate formed by developing the rectangular coordinate having the same area as said rectangle, and the data (1') is recorded.

This coordinate conversion is performed by the means described hereinbefore with reference to FIGS. 6-A and 6-B. The respective steps are the same as shown in FIG. 9.

Referring to FIG. 13, if it is judged at step (xi) that reading of the rectangular coordinate data is completed, at step (xii) the image element ordinate in the longitudinal direction is set at y=1 and the data in which at step (xiii) the ordinate Y is y is read among data recorded after the coordinate conversion.

Then, at step (xiv), the read data are re-arranged in order of the value in the ordinate X and recorded (sorting). At step (xv), it is judged whether or not recording of the coordinate-converted data is recorded, and if it is judged that the recording is not completed, at step (xvi) the supposition of $y=y+1$ is made and reading of data is performed at step (xiii), and the subsequent operations are carried out.

Thus, the coordinate-converted data are put into the printing plate-forming computer 18.

According to the present embodiment, by the foregoing operations, an image element signal on the rectangular coordinate is converted to an image element signal or image element signals on the conversion coordinate formed by developing the rectangular coordinate to an annular plane having an area substantially equal to said rectangle and being corrected according to anisotropy of the plastic flow at the draw-forming operation, and the image element signals on the conversion coordinate can be read and put out in order of the coordinate.

The element signals on the conversion coordinate are supplied to the output scanning mechanism 20 is order of the coordinate to prepare a printing plate or block copy.

According to the third and fourth embodiments of the present invention, digital image element signals on the above-mentioned rectangular coordinate are subjected to coordinate conversion to image element signals of a conversion coordinate of an annular plane while taking anisotropy of the plastic flow at the draw-forming step into consideration by means of a computer, whereby influences on images formed by photographing by a camera or development treatment, such as the fading of the image and the change of the density, can be prevented and prior printing of a blank for draw-forming can be faithfully performed with a good reproducibility. Moreover, the step number and treatment time required for the preparation of a printing plate can be greatly reduced. Furthermore, distortion of the image owing to the difference in the directions at the draw-forming step is completely compensated and the image quality can be easily improved. Still further, if the correspondence table for the coordinate conversion is prepared according to the third embodiment of the present invention, the correspondence table can be utilized repeatedly for cans of the same size even if the design or original is changed, whereby the treatment can be promptly accomplished.

Moreover, if the coordinate conversion is carried out according to the fourth embodiment of the present invention, a printing plate can be promptly prepared by using a computer having a relatively small capacitance.

(Respective Mechanisms)

As the input scanning mechanism 17, there may be adopted a known input mechanism, for example, a cylindrical scanning or plane scanning mechanism in which an original is read line by line in the direction of the axis X (main scanning), and the position is deviated in the direction of the axis Y and reading is performed line by line (subsidiary scanning). The reading operation is accomplished by detecting a reflected or transmitted light by a photoelectric amplifier, a phototransistor or a charge coupling device. In case of a multi-color original, in general, the original is color-separated into cyan, magenta, yellow and black and input scanning is carried out. The number of scanning lines may be changed for a pattern original and a letter original. This device is broadly marketed as a scanner and is easily available.

The printing plate-forming computer comprises a central processing unit (CPU) for receiving input and output commands, performing analysis and various programs and controlling the input and output devices, a terminal device for giving instructions to the central processing unit (CPU) and a station for performing image treatment and editing treatment. Furthermore, the computer is provided with a disc drive used for storing systems and various files and a magnetic tape device used for reading of systems and retreating and restoration of various files. As an appropriate example of the printing plate-forming computer, there can be mentioned a computer marketed under the tradename of Response 300 series by Scitex Co, Israel. Furthermore, similar computers can also be used. For example, there may be used printing plate-forming computers such as Studio 800 series (supplied by Crossfield Co., Great Britain), Chromacom System (supplied by Rudorf Hell Co., West Germany), Pagematic series (supplied by Dainippon Ink Kagaku Kogyo, Japan) and Sigmagraph System 2000 (supplied by Danippon Screen Scizo, Japan).

As the output scanning mechanism 20, there may be adopted known scanning recording systems utilizing such methods as a silver salt photographic method, a dry silver recording method, an electrophotographic method, an electrostatic recording method, a negative type or positive type photoresist recording method, a photopolymer recording method, a diazo photographic method, a dichromic acid-gelatin printing plate-forming method, an electrolytic recording method, a discharge breakdown recording method, an electric heat-sensitive recording method, a heat-sensitive recording method, a pressure-sensitive recording method and an ink-jetting recording method. As the scanning method, there may be adopted mechanical scanning methods such as a cylinder scanning method, a rotary disc scanning method, a helical cylinder scanning method, a belt type plane scanning method and a multiple-needle electrode type plane scanning method, electronic tube scanning methods such as a fly spot tube type scanning method, an optical fiber tube type scanning method and a multiple-needle electrode tube type scanning method, and solid scanning methods such as a multiple-needle electrode head type scanning method.

In the present invention, of these various recording methods, a laser recording method is preferably used for reading of an original and formation of a printing plate because light energy can be concentrated in a region of minute wavelengths, light beams can be scanned over a broad range and on-off changeover can be accomplished promptly. As the laser source, there may be used He—Ne laser, Ar laser and He—Cd laser.

In the present invention, the density of image elements in the rectangular coordinate or final conversion coordinate can be changed in a broad range according to need, but it is generally preferred that the number of image elements be 12 to 100 dots per mm, and it is especially preferred that the number of image elements be 12 to 14 dots per mm in case of a picture pattern or 36 to 100 dots per mm in case of a letter original.

There may be adopted a method in which cyan, magenta, yellow and white-black plates are directly prepared by the output scanning mechanism 20 and they are used for printing a blank, and a method in which a negative image is once prepared and reverse-printed to prepare a printing plate.

In the present invention, in connection with data of the image shear in the rectangular coordinate, the range of positions where anisotropy of the plastic flow of the blank at the draw-forming operation is set on the rectangular coordinate, and position shear data within this set range are recorded in an inner or outer memory of the modification treatment computer 22.

Of the circumferential side wall of the can, the degree of the plastic flow is small in the portion close to the can bottom, and the degree of the plastic flow is gradually increased toward the upper end portion of the can. Accordingly, satisfactory results can be obtained with respect to the effect of preventing the image shear, if the portion above the point of $\frac{1}{4}$ of the height, especially $\frac{1}{3}$ of the height, from the bottom in the rectangular coordinate is determined as the set range where anisotropy should be taken into consideration. In connection with the circumferential direction, the range for consideration of anisotropy may be set along the entire circumference. However, the image shear is caused linearly symmetrically with respect to the axis X or Y or to the axis Z, as shown in FIG. 10. Accordingly, if image shear data within a range of 45° between the axes X and Z are prepared, these data can be used as the image shear data for the entire circumference. As the interval between two adjacent image shear data is small, correction of anisotropy can be corrected at a high precision, but in this case, a large memory becomes necessary. It has been found that satisfactory correction can be generally attained if the interval between two adjacent image shear data on the rectangular coordinate is 0.1 to 2 mm, especially 0.5 to 1 mm. The image shear data can be easily obtained by printing a sheet-shaped metal blank by using a printing plate formed from a rectangular original without taking anisotropy of the plastic flow into consideration, draw-forming the printed blank, winding the rectangular original on the circumferential side wall of the obtained draw-formed can and measuring the shear of the printed image on the circumferential side wall from the image of the original.

The obtained image shear data can be used for draw-formed bodies obtained by subjecting a certain metal blank to certain draw-forming, repeatedly irrespectively of the printing design.

As the metal blank for the can, there may be used untreated steel plates (black plates), various surface-treated steel plates, for example, deposited steel plates such as a tin-deposited steel plate (tinplate), a zinc-deposited steel plate, an aluminum-deposited steel plate, a nickel-deposited steel plate and a chromium-deposited steel plate, electrolytically treated steel plates such as an electrolytically chromate-treated steel plate, chemically treated steel plates such as a phosphate- and/or chromate-treated steel plate, plates of light metals such as aluminum, and composites thereof.

The thickness of the metal blank depends on the final size of the container and the kind of the blank, but it is generally preferred that the thickness of the blank be 0.1 to 0.5 mm, especially 0.2 to 0.35 mm.

The metal blank may be coated with a lacquer excellent in the processability and corrosion resistance, such as an epoxy-phenolic lacquer, an epoxy-aminoplast lacquer, an epoxy-acrylic lacquer or an epoxy-vinyl lacquer prior to printing. Moreover, a whiting lacquer formed by incorporating titanium oxide into a lacquer as mentioned above may be applied to the surface to be printed.

Printing can be performed by using a printing plate formed according to the above-mentioned method according to a known printing process such as a planographic printing process, an offset printing process, a screen printing process, a gravure printing process, a relief printing process, an intaglio printing process or an electrophotographic printing process. Known printing inks or ultraviolet ray-curable inks may be used as the printing ink.

A draw-formed can may be prepared by cutting the printed metal blank into a disc or the like and subjecting the disc to single-stage or multi-stage draw-forming between a drawing punch and a drawing die. It is preferred that the total draw ratio expressed by the ratio of the diameter of the blank to the bottom diameter of the draw-formed vessel be in the range of from 1.2 to 3.0, especially from 1.3 to 2.9.

According to the present invention, the linearity in the circumferential direction of the printed image in the upper portion of the side wall can be maintained at such a high level that the shear between the rolling direction and the direction intersecting the rolling direction at 45° is within 1% of the height of the side wall, and the linearity of the printed image in the axial direction can be maintained at such a high level that the shear at the point separate by about 22° from the rolling direction is within 1% of the length of the outer circumference of the side wall.

The present invention will now be described in detail by the following examples.

EXAMPLE 1

As the metal blank 5 shown in FIG. 3-A, a tin-free steel plate of aluminum killed steel having a tempering degree of T-4CA and a thickness of 0.21 mm was used.

A rectangular printing original as shown in FIG. 2, which had a height H of 27.5 mm and a length L of 206.25 mm, was used, and digital image elements were put into the printing plate-forming computer 18 shown in FIG. 5 by the input scanning mechanism 17 shown in FIG. 5. Chromagraph 299 scanner system and Response 320 system were used as the input scanning system and printing plate-forming computer, respectively. The digital element to be put in the computer had a size of H=990 image elements and L=7425 elements.

The image data put in the computer 18 are put out into the modification treatment computer 22 shown in FIG. 5. Facom M340S computer system was used as the modification treatment computer. In the computer 22, the coordinate conversion from the rectangular coordinate to the annular coordinate was carried out while taking anisotropy of the plastic flow at the draw-forming step into consideration according to the process illustrated in FIGS. 6-A, 6-B, 12 and 13. In FIGS. 6-A and 6-B illustrating the coordinate conversion, conditions of l=990, m=7425 and n=4300 were set.

The coordinate-converted digital image element signals were put into the printing plate-forming computer again, and a printing plate having an image annularly developed while taking anisotropy of the plastic flow into consideration, as shown in FIG. 10, was prepared by the output scanning mechanism 20 shown in FIG. 5. ELP II laser plotter system was used as the output scanning mechanism.

The surface of the above-mentioned metal blank was printed according to the offset printing process using the so-prepared printing plate.

The printed metal blank was cut into a circular blank having a diameter of 126.5 mm at the shearing step shown in FIG. 3-B. Then, a draw-formed can as shown in FIG. 1 was prepared from this circular blank by the two-staged draw-forming operation shown in FIG. 3-C under conditions of a blank holder pressure of 4 Kg/cm², a drawing punch diameter of 64.9 mm and a draw ratio of 1.95.

The shear between the printed image on the side wall of the draw-formed can and the above-mentioned rectangular printing original was such that the shear between the rolling direction and the direction intersecting the rolling direction at 45° was within 1% of the height of the side wall of the formed can and also within 1% in the circumferential direction of the side wall. Thus, a good draw-formed printed can was obtained.

EXAMPLE 2

An Al-Mg type alluminum alloy sheet having a thickness of 0.24 mm was used as the metal blank 5 shown in FIG. 3-A, and a draw-formed printed can was prepared in the same manner as described in Example 1 except that the blank holder pressure at the draw-forming step shown in FIG. 3-C was changed to 2 Kg/cm².

As a result, there was obtained a draw-formed printed can in which the shear of the printed image on the side wall of the draw-formed can from the image of the rectangular original was within 1% of the height of the side wall between the rolling direction and the direction intersecting the rolling direction at 45°, and this image shear was within 1% of the circumference of the side wall of the can.

We claim:

1. A process for the preparation of a printed draw-formed body having a printed image on the side wall thereof by subjecting a prior-printed blank to draw-forming, which comprises converting an image of an original to be printed to a digital image element signal on a rectangular coordinate, converting the image element signal on the rectangular coordinate to an image signal or image signals on a corresponding conversion coordinate formed by developing the rectangular coordinate to an annular plane having an area substantially equal to the area of said rectangle, substantially equal to the area of said rectangle, reading image element signals on the conversion coordinate in order of the coordinate, photo-electrically converting the read image element signals to a printing plate for the blank and printing the blank by using the formed printing plate.

2. A process according to claim 1, wherein the conversion of the image signal on the rectangular coordinate to an image element signal or image element signals on the conversion coordinate is performed through the operation of the preparation of a correspondence table between the rectangular coordinate and the annular conversion coordinate and the operation of the rewriting from the rectangular coordinate to the conversion coordinate based on the corresponding table.

3. A process according to claim 1, wherein the conversion of the rectangular coordinate a,b to the corresponding conversion coordinate a',b' is carried out so that the following relations are established: the following relations are established:

$$a' = \gamma \sin \theta + 0 \quad (1)$$

$$b' = \gamma \cos \theta + 0 \quad (2)$$

wherein a' and b' are integers obtained by rounding, and the radius $\gamma$, angle $\theta$ and center 0 are expressed by the following formulae:

$$r = \sqrt{\frac{m}{\pi}\left(a + \frac{m}{4\pi}\right)} \quad (3)$$

$$\theta = \frac{2\pi b}{m} \quad (4)$$

$$O = \sqrt{\frac{m}{\pi}\left(l + \frac{m}{4\pi}\right)} \quad (5)$$

4. A process for the preparation of a draw-formed body having a printed image on the side wall by subjecting a prior-printed blank to draw-forming, which comprises photo-electrically converting an image of an original to be printed to an image element signal on a corresponding digital rectangular coordinate, subjecting the rectangular coordinate to digital coordinate conversion to an annular plane having an area substantially equal to the area of said rectangle, calculating a new coordinate of the image element signal present in a space between the conversion coordinate corresponding to adjacent image elements of the rectangular coordinate, substituting the image element signal on the digital rectangular coordinate into the corresponding conversion coordinate and new coordinate, reading the image element signals on the conversion coordinate in order of the ordinate, photo-electrically converting the read signals to a printing plate and printing the blank by using the formed printing plate.

5. A process according to claim 4, wherein the conversion of the rectangular coordinate a,b to the corresponding conversion coordinate a',b' is performed so that the following relations are established:

$$a' = \gamma \sin \theta + 0 \quad (1)$$

$$b' = \gamma \cos \theta + 0 \quad (2)$$

wherein a' and b' are integers obtained by rounding, and the radius $\gamma$, angle $\theta$ and center 0 are expressed by the following formulae:

$$r = \sqrt{\frac{m}{\pi}\left(a + \frac{m}{4\pi}\right)} \quad (3)$$

$$\theta = \frac{2\pi b}{m} \quad (4)$$

$$O = \sqrt{\frac{m}{\pi}\left(l + \frac{m}{4\pi}\right)} \quad (5)$$

and the angle is increased to some extent over the corresponding conversion coordinate a',b' and a new coordinate value including this increase of the angle is calculated.

6. A process for the preparation of a draw-formed printed can, which comprises converting an image of an original to be printed to a digital image element signal on a rectangular coordinate, converting the image element signal on the rectangular coordinate to an image element signal or image element signals on a corresponding conversion coordinate formed by developing the rectangular coordinate to an annular plane having an area substantially equal to the area of said rectangle and making correction according to anisotropy of the elongation of a metal blank, reading image element signals on the conversion coordinate in order of the coordinate to form a printing plate for the blank and printing the blank by using the formed printing plate.

7. A process for the preparation of a draw-forming printing can having a printed image on the side wall by subjecting a prior-printed metal blank to draw-forming, which comprises converting an image of an original to be printed to an image element signal on a corresponding digital rectangular coordinate, subjecting the rectangular coordinate to digital coordinate conversion to an annular plane having an area substantially equal to the area of said rectangle and corrected according to anisotropy of the elongation of the metal blank, calculating a new coordinate of the image element signal present in a space between the conversion coordinate corresponding to adjacent image elements of the rectangular coordinate, substituting the image element signal on the digital rectangular coordinate into the corresponding conversion coordinate and new coordinate, reading the image element signals on the conversion coordinate in order of the coordinate, photo-electrically converting the read signals to a printing plate and printing the blank by using the formed printing plate.

8. A draw-formed printed can having a printed image formed at least on the outer surface of the side wall, which is prepared by subjecting a prior-printed metal blank to draw-forming, wherein the linearity in the circumferential direction of the printed image in the upper portion of the side wall is maintained at such a level that the shear in the rolling direction is within 1% of the height of the side wall and the linearity in the axial direction of the printed image is maintained at such a level that the shear at the position spaced by about 22° from the rolling direction is within 1% of the length of the circumference of the side wall.

* * * * *